United States Patent
Kokot et al.

(12) United States Patent (10) Patent No.: US 12,541,215 B2
(45) Date of Patent: Feb. 3, 2026

(54) MULTI-STAGE PRESSURIZED GAS DELIVERY SYSTEM

(71) Applicant: Vanair Manufacturing, Inc., Michigan City, IN (US)

(72) Inventors: Ralph Kokot, Crown Point, IN (US); Kai Justice, Wheatfield, IN (US); Todd A. Zeigner, Rolling Prairie, IN (US); Robert W. Gasiecki, La Porte, IN (US)

(73) Assignee: VANAIR MANUFACTURING, INC., Michigan City, IN (US)

( * ) Notice: Subject to any disclaimer, the term of this patent is extended or adjusted under 35 U.S.C. 154(b) by 0 days.

(21) Appl. No.: 18/884,312

(22) Filed: Sep. 13, 2024

(65) Prior Publication Data

US 2025/0093892 A1 Mar. 20, 2025

Related U.S. Application Data (60) Provisional application No. 63/583,057, filed on Sep. 15, 2023.

(51) Int. Cl.
*G05D 16/20* (2006.01)
*G05D 7/06* (2006.01)

(52) U.S. Cl.
CPC ....... *G05D 16/2024* (2019.01); *G05D 7/0635* (2013.01); *Y10T 137/4673* (2015.04); *Y10T 137/4807* (2015.04)

(58) Field of Classification Search
CPC .............. G05D 16/2024; G05D 7/0635; Y10T 137/4673; Y10T 137/4807
USPC .................................................. 137/255, 263
See application file for complete search history.

(56) References Cited

U.S. PATENT DOCUMENTS

| | | | | |
|---|---|---|---|---|
| 3,589,387 A | * | 6/1971 | Raymond | ........... F15B 13/0896 137/271 |
| 4,372,193 A | * | 2/1983 | Hall | ........................ F15B 11/02 91/518 |
| 5,744,695 A | * | 4/1998 | Forbes | ..................... G01F 25/13 73/1.35 |
| 7,165,397 B2 | * | 1/2007 | Raszga | ................. F15B 11/166 60/431 |

(Continued)

FOREIGN PATENT DOCUMENTS

| EP | 3 615 805 B1 | 6/2023 |
|---|---|---|
| EP | 3217013 B1 | 9/2024 |

(Continued)

OTHER PUBLICATIONS

International Search Report and Written Opinion from Corresponding Application No. PCT/US2024/046594; Dated Nov. 14, 2024; pp. 1-15.

(Continued)

*Primary Examiner* — William M Mccalister
(74) *Attorney, Agent, or Firm* — Ivan P. Gracic (57) ABSTRACT

A pressurized gas delivery system includes at least a first gas supply source and a second gas supply source. The first gas supply source is configured to supply a first pressurized gas output, and the second gas supply source is configured to supply a second pressurized gas output. A valve including at least a first position and a second position fluidly connects an outlet of the first gas supply source to a system outlet in the first position and to an inlet of the second gas supply source in the second position.

18 Claims, 4 Drawing Sheets

(56) References Cited

U.S. PATENT DOCUMENTS

| | | | |
|---|---|---|---|
| 7,798,167 B2* | 9/2010 | Ohmi | G05D 16/208 |
| | | | 137/601.01 |
| 11,041,437 B2 | 6/2021 | Homison et al. | |
| 11,556,141 B2* | 1/2023 | Bork | G05D 16/2022 |
| 11,585,301 B1 | 2/2023 | Boyer et al. | |
| 2003/0111112 A1* | 6/2003 | Gill | F17C 7/00 |
| | | | 137/255 |
| 2008/0156769 A1* | 7/2008 | Weiner | H01L 21/67017 |
| | | | 156/345.29 |
| 2013/0104582 A1 | 5/2013 | Sandkoetter et al. | |
| 2015/0104329 A1 | 4/2015 | Chin et al. | |
| 2023/0144628 A1 | 5/2023 | Babbitt et al. | |
| 2025/0075711 A1* | 3/2025 | Waßmann | F15B 11/10 |
| 2025/0093892 A1* | 3/2025 | Kokot | G05D 16/2024 |

FOREIGN PATENT DOCUMENTS

| | | |
|---|---|---|
| IN | 202117054831 A | 6/2022 |
| JP | S61-149597 A | 7/1986 |
| WO | 2017/215992 A1 | 12/2017 |

OTHER PUBLICATIONS

Corrado (Siciliano376); Engineering Forum "Re: Changing Compressor Arrangement from Parallel to Series;" https://www.eng-tips.com/viewthread.cfm?qid=417426; Forum Dated Nov. 21, 2016; Originally Accessed on Oct. 22, 2024; pp. 1-5.

* cited by examiner

MULTI-STAGE PRESSURIZED GAS DELIVERY SYSTEM

CROSS REFERENCE TO RELATED APPLICATION/INCORPORATION BY REFERENCE

This application claims the benefit of U.S. Provisional Application No. 63/583,057, filed on Sep. 15, 2023, entitled "MULTI-STAGE PRESSURIZED GAS DELIVERY SYSTEM," the entire contents of which are incorporated herein by reference in its entirety.

TECHNICAL FIELD

The present disclosure generally relates to gas supply systems, and more specifically, a gas supply system adapted to increase the pressure and/or volumetric flow rate of gas supplied therefrom.

BACKGROUND

Certain applications requiring gas (e.g., Nitrogen, Argon, etc.) or a gas mixture (e.g., air) as an input may require increasing the pressure and/or volumetric flow rate of the gas or gas mixture supplied thereto. For example, a combustion chamber for a turbocharger generally requires increasing the pressure and flow rate of air supplied thereto to achieve higher horsepower. Likewise, certain pipeline line applications may require high-pressure air, for example, to accomplish an irrigation blowout, blow bulk product (e.g., flour or limestone) through the pipeline, or to drive a utility line (tethered to a parachute) therethrough. Some gas supply devices (e.g., compressors, blowers, and the like) may be operable to pressurize the gas or gas mixture that is supplied to the downstream application. However, increasing the gas pressure with such devices can be problematic due to temperature constraints. For example, pressurizing air via a single-stage compressor to achieve a high-pressure output (exceeding 30+ psig) may undesirably increase the temperature of the air beyond an acceptable threshold that renders the air unsuitable for the downstream application or in a way that degrades the functionality of the compressor (and/or downstream components) based on high temperature heat exposure, e.g., thermal fatigue. It is desirable to provide pressurized gas or gas mixtures at increased pressures and flow rates in a manner that modulates heat generation.

BRIEF SUMMARY

The following presents a simplified summary of the disclosure in order to provide a basic understanding of some example aspects described in the detailed description. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

The present invention provides, but is not limited to, systems and methods of providing a pressurized gas (e.g., air) to an application.

According to a nonlimiting aspect of the invention, such a multi-stage pressurized gas delivery system includes at least a first gas supply device and a second gas supply device that produce first and second pressurized gas outputs, respectively. The first and second gas supply devices are fluidly connected so that the first pressurized gas output and/or the second pressurized gas output can be used to meet flow rate and pressure requirements for a downstream application. If only one of the first and second gas supply devices is utilized to meet the demands of the application, the first and second gas supply devices are connected in parallel (parallel mode) such that either the first gas supply device or the second gas supply device is operated to produce the output of the system. If both the first and second gas supply devices are utilized to meet the demands of the application, the first and second gas supply devices are either connected in parallel (the parallel mode) to produce and increase a volumetric output of the system, or connected in series (the series mode) increase the pressure output of the system.

In accordance with another aspect, there is provided pressurized gas delivery system including a first gas supply source configured to supply a first pressurized gas output, a second gas supply source configured to supply a second pressurized gas output, and a control valve including at least a first position and a second position. The control valve is configured to connect an outlet of the first gas supply source to a system outlet in the first position and connect an outlet of the first gas supply source to an inlet of the second gas supply source in the second position. In the first position, the control valve directs the first pressurized gas output to the system outlet in a parallel mode. In the second position, the control valve directs the first pressurized gas output to the inlet of the second gas supply source in a series mode.

In one embodiment, an outlet of the second gas supply source is fluidly connected to the system outlet.

In one embodiment, the control valve directs the first pressurized gas output to the system outlet and the second gas supply source directs the second pressurized gas output to the system outlet to increase the flow rate of the system pressurized gas output.

In one embodiment, the first pressurized gas output is directed to the inlet of the second gas supply source at a first pressure value in the series mode, and the second gas supply source is configured to increase the pressure of the first pressurized gas output to a second pressure value exceeding the first pressure value such that the second pressurized gas output comprises the second pressure value.

In one embodiment, the second pressurized gas output is supplied to the system outlet to increase the pressure of the system pressurized gas output.

In one embodiment, the control valve comprises a third position. In the third position, the control valve impedes the first pressurized gas output from passing therethrough.

In one embodiment, the system further includes a controller. The controller includes to receive an application input defining the system pressurized gas output, and adjust the control valve to the first position or the second position based on the application input.

In one embodiment, the first gas supply source is driven via a first driver, and the second gas supply source is driven via a second driver. The first driver is operable to adjust a speed of the first gas supply device to adjust the pressure of the first pressurized gas output, and the second driver is configured to adjust a speed of the second gas supply device to adjust the pressure of the second pressurized gas output.

In one embodiment, the system further includes a first cooler disposed between the outlet of the first gas supply device and the control valve. The first cooler is configured to adjust the temperature of the first pressurized gas output.

In one embodiment, the system further includes a temperature sensor disposed between the outlet of the first gas supply device and the control valve, and the controller is configured to receive a first temperature measurement from the first temperature sensor and adjust the speed of the first gas supply device or the second gas supply device based on the first temperature measurement.

In one embodiment, the system includes a second cooler disposed between the outlet of the second gas supply device and the system outlet. The second cooler is configured to adjust the temperature of the second pressurized gas output.

In one embodiment, the system further includes a second temperature sensor disposed between the outlet of second gas supply device and the system outlet, and the controller is configured to receive a second temperature measurement from the second temperature sensor and adjust the speed of the first gas supply device or the second gas supply device based on the second temperature measurement.

In one embodiment, the system further includes a first pressure sensor disposed between the outlet of the first gas supply device and the control valve, and the controller is configured to receive a first pressure measurement from the first pressure sensor and adjust the speed of the first gas supply device or the second gas supply device based on the first pressure measurement.

In one embodiment, the system further includes a second pressure sensor disposed between the outlet of the second gas supply device and the system outlet, wherein the controller is configured to receive a second pressure measurement from the second pressure sensor and adjust the speed of the second gas supply device or the first gas supply device based on the second pressure measurement.

In one embodiment, the system further includes a third pressure sensor disposed between the control valve and the inlet of the second gas supply device, and the controller is configured to receive a third pressure measurement from the third pressure sensor and adjust the speed of the first gas supply device or the second gas supply device based on the third pressure measurement.

In one embodiment, the system further includes a third temperature sensor disposed between the control valve and the inlet of the second gas supply device, and the controller is configured to receive a third temperature measurement from the third temperature sensor and adjust the speed of the first gas supply device or the second gas supply device based on the third temperature measurement.

In one embodiment, the system further includes a water separator disposed between the control valve and the inlet of the second gas supply device. The water separator is configured to remove moisture from the first pressurized gas output supplied to the second gas supply device in the series mode.

In one embodiment, the first gas supply source and the second gas supply device are driven via a single driver. The single driver includes a first continuously variable transmission (CVT) operatively connected to the first gas supply device, and a second CVT operatively connected to the second gas supply device. The first CVT is configured to independently adjust a speed of the first gas supply device, and the second CVT is configured to independently adjust a speed of the second gas supply device.

In one embodiment, a first filter is disposed adjacent to the inlet of the first gas supply device, and a second filter is disposed adjacent to the inlet of the second gas supply device.

In accordance with another aspect, a method of producing pressurized gas with a gas delivery system (including a controller operatively connected to a first gas supply device, a control valve, and a second gas supply device) includes receiving, via the controller, an application input defining a system pressurized gas system output; and adjusting the control valve to at least one of a first position or a second position based on the application input. The first position corresponds to a parallel mode to increase the flow rate of the system pressurized gas output, and the second position corresponds to a series mode to increase the pressure of the system pressurized gas output.

In one embodiment, the method includes operating the first gas supply device to produce a first pressurized gas output, supplying the first pressurized gas output to a system outlet, operating the second gas supply device to produce a second pressurized gas output, and supplying the second pressurized gas output to the system outlet when the control valve is set to the parallel mode.

In one embodiment, the method includes operating the first gas supply device to produce a first pressurized gas output, supplying the first pressurized gas output to the second gas supply device, utilizing the first pressurized gas output to produce a second pressurized gas output having a pressure that is higher than a pressure of the first pressurized gas output, and supplying the second pressurized gas output to the system outlet as the system pressurized gas output when the control valve is set to the series mode.

In one embodiment, the method includes receiving system data via the controller, and adjusting at least one of the first gas supply device and the second gas supply device based on the system data to maintain the system pressurized gas output.

In one embodiment, the system data includes at least one of a pressure value, temperature value, flow rate value, and a humidity data value.

The following description and the drawings disclose various illustrative aspects. Some improvements and novel aspects may be expressly identified, while others may be apparent from the description and drawings.

DETAILED DESCRIPTION OF THE INVENTION

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise. Furthermore, as herein disclosed, the terms "substantially," "about," and variations thereof are intended to note that the described features are equal or approximately equal to a value or characteristic, as desired, reflecting tolerances, conversion factors, rounding off, measurement error and the like, and other factors. For example, the term "substantially" is intended to denote values or characteristics that are exact or within 15% of exact, for example within 10% of exact, or within 5% of exact. As another example, the term "about" can denote values within 15%, 10%, or 5% of a specified value.

Figure 1:
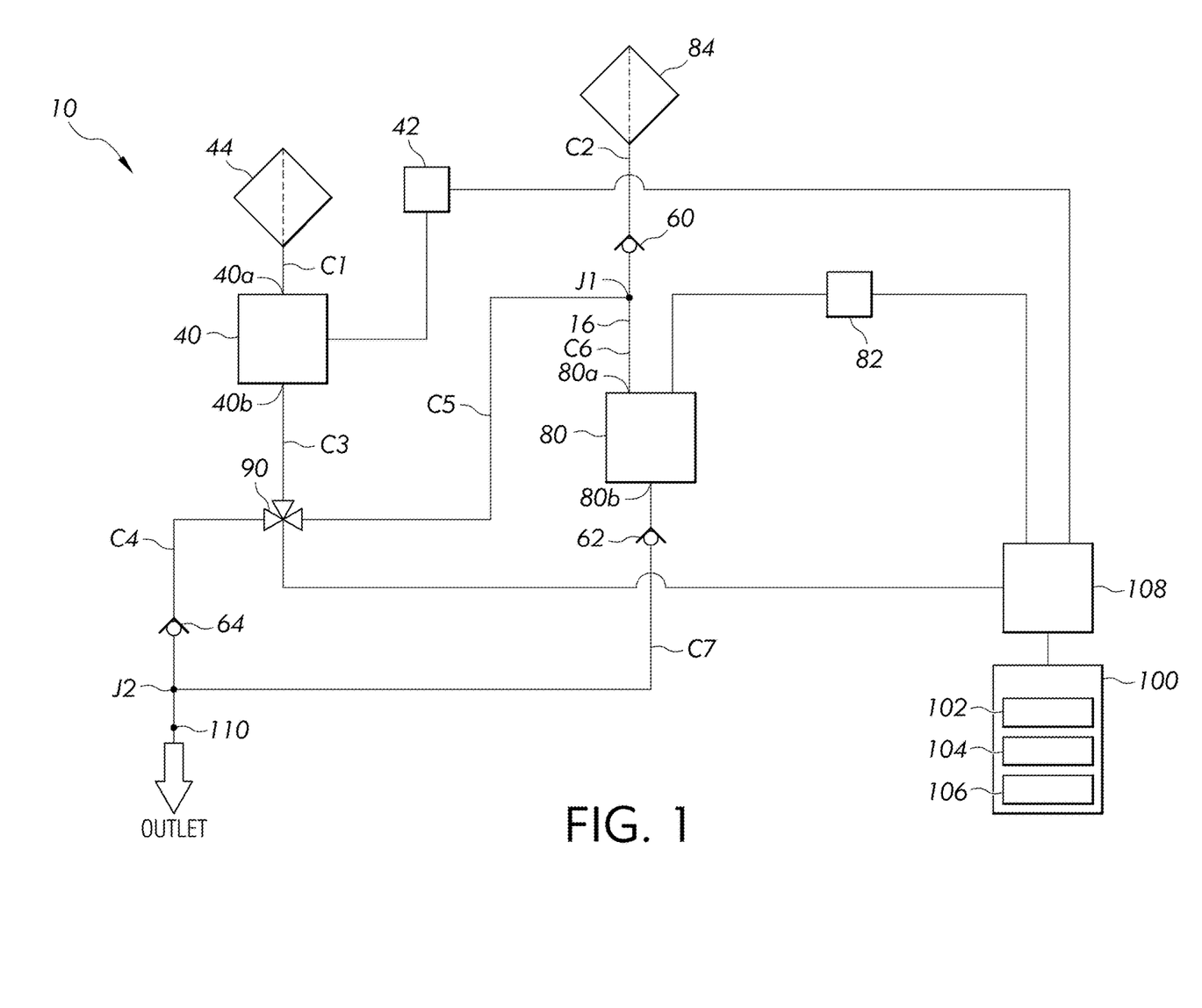
FIG. 1 schematically illustrates a multi-stage pressurized gas delivery system in accordance with a first nonlimiting embodiment of the present disclosure.

FIG. 1 schematically illustrates an example multi-stage pressurized gas delivery system 10 comprising components and control logic to allow two or more gas supply devices (including but not limited to, compressors (e.g., variable speed drive compressors, variable speed rotary screw compressors, reciprocating compressors (e.g., piston compressors), and the like), blowers (e.g., positive displacement blowers, variable speed blowers, centrifugal blowers, and the like), super chargers, turbo chargers, gas generators (e.g., membrane-based generators, PSA generators)) to operate in a parallel or in a series mode to achieve the demands of various applications that utilize pressurized gas. For the purposes of this disclosure, reference to a "pressurized gas" is intended denote a pressurized gas mixture (e.g., air) or other examples of gases, including, but not limited to, Nitrogen, Argon, Helium, Carbon Dioxide, and/or any other suitable example or mixture thereof. As a matter of convenience, the following description will refer to the system 10 as having two gas supply devices, namely, a first gas supply device 40 to produce a first pressurized gas output, and a second gas supply device 80 to produce a second pressurized gas output. For the purposes of this disclosure, pressurized gas produced by the system 10 (via one or both of the first and second gas supply devices) may be referred to as a system pressurized gas output. In addition, the first and second gas supply devices 40 and 80 may also be referred to as gas moving, gas producing, or gas delivery supply sources. In the embodiment shown, there are two gas supply devices. It should be understood that the system 10 could comprise more than two gas supply devices that generate and/or supply pressurized gas to a system output.

Each of the first and second gas supply devices 40 or 80 may be driven (powered) by a driver to increase the pressure and/or flow rate of gas (e.g., air) entering an inlet (e.g., 40a of 80a) thereof. For the purposes of this disclosure, the term "driver" is intended to denote a power unit adapted to drive the gas supply devices 40 and 80, including, but not limited to, an electric motor, hydraulic motor, internal combustion engine, or any other suitable power unit used to drive the gas supply devices 40 and 80. In the embodiment shown, the first gas supply device 40 is driven by a first driver 42, and the second gas supply device 80 is driven by a second driver 82. In other embodiments, the first and second gas supply devices 40 and 80 may be driven by a single driver, as discussed in detail below.

The system 10 may comprise one or more control systems or controllers for individually or collectively controlling the gas supply devices 40 and 80. In the embodiment shown, the system 10 comprises a controller 100 operatively connected to the first and second drivers 42 and 82 and to a control valve 90 disposed between an outlet 40b of the first gas supply device 40 and an inlet 80a of the second gas supply device 80. In some embodiments, the controller 100 may comprise a processor 102 and a storage device 104. The processor 102 may be configured to execute the disclosed methodologies and processes for supplying a system pressurized gas output described herein. The processor 102 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The storage device 104 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the storage device 104 includes multiple kinds of memory, particularly volatile memory and non-volatile memory. The storage device 104 may comprise computer readable media on which one or more sets of instructions (such as software for executing one or more pressurized gas supply procedures or methods) may be embedded. The instructions may embody one or more of the methods or logic as described herein. In some embodiments, the instructions may reside completely, or at least partially, within any one or more of the storage device 104, the computer readable medium, and/or within the data processor 102 during execution of the instructions.

The controller 100 may utilize various computing environments for implementing aspects of the present disclosure, including, for example, a computer, wherein the computer includes a processing unit, a system memory, and a system bus. The system bus couples system components including, but not limited to the storage device 104 to the processor 102.

Moreover, the controller 100 may comprise or be communicatively coupled to a user interface 106 operable to receive inputs and display outputs concerning an operational status of the system 10. In particular, the user interface 106 provides an interface between the user (e.g., an operator) and the controller 100. The user interface 106 may include digital and/or analog interfaces (e.g., input devices and output devices) to receive inputs from the user (e.g., a command input, for example, to select between one or more gas application inputs corresponding to one or more gas supply procedures), a stop command, a pause command, a start command, and the like). Moreover, the user interface 106 may be configured to display system data (discussed below) while the system 10 is operating in real time.

The input devices may include, for example, a control knob, buttons, a slider, a touch screen, a camera (for image capture of a tag or QR code corresponding to a pressurized gas producing procedure) and/or visual command recognition), an audio input device (e.g., a microphone), and/or a touchpad. In some embodiments, the controller 100 may be communicatively coupled with components of the system via a communications component 108. For example, the communications component 108 can enable communication between the controller 100 and the first and second gas supply devices 40 and 80, communication between the controller 100 and the first and second drivers 42 and 82, and communication between the controller 100 and the control valve 90. The communication component 108 can include physical and/or logical interfaces for connecting the controller 100 to the components of the system. For example the communications component 108 can enable Wi-Fi-based communication such as via frequencies defined by the IEEE 802.11 standards, short-range wireless frequencies such as Bluetooth®, cellular communication (e.g., 2G, 3G, 6G, 6G LTE, 5G, etc.) or any suitable wired or wireless communications protocol that enables the controller 100 to interface with the system components, or with other systems, for example, if one or more systems are communicatively coupled with and/or controlled by the controller 100.

Still referring to FIG. 1, the first and second gas supply devices 40 and 80 are represented as each having a filter disposed adjacent to an inlet (e.g., an intake) thereof, respectively, a first filter 44 disposed adjacent to and connected to an inlet 40*a* of the first gas supply device 40 (via a first conduit C1), and a second filter 84 disposed adjacent to and connected to an inlet 80*a* of the second gas supply device 80 (via a second conduit C2). The first and second filters 44 and 84 may each be sized appropriately for its associated gas supply device 40 and 80. In some embodiments, the first and second filters 44 and 84 may embody air filters (e.g., fiberglass, polyester, washable, pleated, and electrostatic filters). In some embodiments, the first and second filters 44 and 84 may comprise air filters and/or moisture filters (e.g., any suitable example of an inlet moisture filter or water trap). In some embodiments, the system 10 may not require the first and/or the second filters 44 and 84, for example, in embodiments wherein gas supplied to the first and second gas supply devices has already been purified (such that the gas could be supplied directly to the inlets 40*a* and 80*a* of the first and second devices 40 and 80, respectively).

The control valve 90 is a device operable to selectively direct the flow of a pressurized gas (i.e., the first pressurized gas output) exiting an outlet 40*b* of the first gas supply device 40. The control valve 90 may be operable in a plurality of positions. For example, in a first position, the control valve 90 may direct the first pressurized gas output to the system outlet 110 via a third conduit C3 connected between the outlet 40*b* of the first gas supply device 40 and the control valve 90, and a fourth conduit C4 connected between the control valve 90 and the system outlet 110. In some embodiments, the third and fourth conduits C3 and C4 may embody a single conduit with the control valve 90 partitioning a first flow passage (between the outlet 40*b* and the control valve 90) from a second flow passage (between the control valve 90 and the system outlet 110). When the control valve 90 is in the first position, the system 10 may be referred to as being operated in a "parallel mode."

In a second position, the control valve 90 may direct the first pressurized gas output to the inlet 80*a* of the second gas supply device 80 via the third conduit C3, a fifth conduit C5 (also referred to as an interstage conduit), and a sixth conduit C6. In some embodiments, the fifth and sixth conduits C5 and C6 may embody a single conduit (as opposed to two separate conduits connected at junction J1, as shown). When the control valve 90 is in the second position, the system 10 may be referred to as being operated in a "series mode." In this manner, the control valve 90 may be operable to direct flow in a parallel mode (e.g., in the first position) or in a series mode (e.g., in the second position). The control valve 90 may be sized appropriately for the first pressurized gas output of the first gas supply device 40. In some embodiments, the control valve 90 may be operated manually, electrically, or hydraulically independently or under the control of the controller 100. In various non-limiting examples, the control valve 90 may embody a three-position solenoid valve with an inlet port (connected to the third conduit C3), and first and second outlet ports respectively connected to the fourth conduit C4 and the fifth conduit C5. The control valve 90 may also be operable to impede pressurized gas (exiting outlet 40*b* or outlet 80*b*) from passing through the control valve 90 in a third position, for example, in such embodiments wherein the control valve 90 is a solenoid valve. In this manner, the controller 100 may comprise logic to operate the control valve 90 in one of the first, second, and third positions based on the flow and pressure requirements prescribed for a given application. In some embodiments, the control valve 90 may take on other forms, including, but not limited to, another suitable example of a solenoid valve (with more than three positions, for example, a fourth position for venting to the atmosphere) or a manual valve (e.g., a 3-way ball valve or diverter valve). The control valve 90 may be manipulated (e.g., via the controller 100) so that one or both of the first and second gas supply devices 40 and 80 supply pressurized gas at the desired system pressurized gas output (e.g., a desired flow rate or pressure) for a particular application.

As noted above, when the control valve 90 is set to the first position, the system 10 is in the parallel mode, in which the outlets 40*b* and 80*b* of the first and second gas supply devices 40 and 80 are fluidly connected to the system outlet 110 via the third, fourth, and seventh conduits, C3, C4, and C7, respectively. Although in some embodiments, both of the first and second gas supply devices 40 and 80 may not need to be operating in the parallel mode, for example, when the control valve 90 is in a third position to impede the first pressurized gas output from passing through the control valve 90, e.g., when it is desired to only operate the second gas supply device 80 to supply pressurized gas therefrom (i.e., the second pressurized gas output) to the system outlet 110 (such that the second pressurized gas becomes the system pressurized gas output). It is also contemplated that only the first gas supply device 40 may be operated in the first position, e.g., to supply the first pressurized gas output to the system outlet 110 (such that the first pressurized gas output becomes the system pressurized gas output), while the second gas supply device 80 is selectively deactivated via the controller 100 (e.g., by turning off the second driver 82).

As noted above, when the control valve 90 is set to the second position, the system 10 may operate in the series mode in which the gas supply devices 40 and 80 are fluidly connected via the third conduit C3, the fifth or innerstage conduit C5, and the sixth conduit C6. It should be understood that in some embodiments, the gas supply devices 40 and 90 may be fluidly connected via only the third conduit C3 and the innerstage conduit C5, for example, in such embodiments wherein the innerstage conduit C5 is connected directly to the inlet 80*a* of the second gas supply device 80. Operating in the series mode may be particularly beneficial to increase the pressure of gas supplied from the system outlet 110 (i.e., the system pressurized gas output) to a certain pressure value that would otherwise not be possible when operating a single gas supply device due to temperature and pressure constraints. For example, the first gas supply device 40 may raise the pressure of gas (entering an inlet thereof) to a first pressure value (e.g., 15 psig), and supply the first pressurized gas output (at the first pressure value) to the inlet 80*a* of the second gas supply device 80 to incrementally increase the pressure of the first pressurized gas output from the first pressure value to a second pressure value. In this manner, in the series mode, the second gas supply device 80 may only need to incrementally increase the pressure from the first pressure value to a second pressure value (e.g., 30 psig) corresponding to a desired system pressurized gas output. This aspect of the present disclosure is particularly beneficial to modulate heat generation since operating a single gas supply device to increase the pressure of gas to the second pressure value (e.g., 30 psig) may not be feasible, since doing so would undesirably overheat the temperature of the gas in a manner that is unsuitable for the downstream application, or in a manner that may damage downstream components. In the series mode, the first and second devices 40 and 80 may be driven separately (via the first and second drivers 42 and 82), or driven through an alternative means (discussed below), for example, a single driver as discussed in detail below.

A first valve 60 may may be disposed between the second filter 84 and the inlet 80*a* of the second gas supply device 80. In the embodiment shown, the first valve 60 is disposed on the second conduit C2, upstream of the junction J1 between the fifth and sixth conduits C5 and C6. The first valve 60 may unidirectionally allow gas flowing from the filter 84 to the inlet 80*a* of the second gas supply device 80, while precluding flow in the opposite direction, i.e., to preclude gas from flowing back to the filter. In some embodiments, the first valve 60 may embody a check valve, or a manually or electronically controlled shut off valve, e.g., a ball valve, a butterfly valve, a gate valve, or an electrically actuated ball valve or solenoid valve. When the system 10 is switched to operate in the series mode, the first pressurized gas output is directed (by the control valve 90) to the second gas supply device 80, and the first valve 60 may actuated (via the controller 100) to preclude gas from flowing toward the second filter 84.

The system 10 may also include a second valve 62 to prevent the first pressurized gas output from back-feeding to the second gas supply device 80, for example, when the system 10 is operating in a parallel mode (e.g., when the control valve 90 is in the first position, and the first gas supply device 40 is operated to supply the system pressurized gas output). In some embodiments, the second valve 62 could be used to prevent the system pressurized gas output from backflowing toward the second gas supply device 80, for example, if there were an obstruction in the seventh conduit C7, or if a downstream pressure vessel (configured to store the system pressurized gas output) were to expel the system pressurized gas output back toward the second gas supply device 80, e.g., based on a rupture or other failure. The system 10 may also include a third valve 64 configured to prevent the second pressurized gas output from back-feeding to the first gas supply device 40. Although it is contemplated that the control valve 90 may be utilized to preclude the second pressurized gas output from back-feeding to the first gas supply device 40, obviating the need for the third valve 64. Further still, in series mode, it is contemplated that the control valve 90 may preclude the first pressurized gas output from passing through the fourth conduit C4 and toward the second gas supply device 80, obviating the need for the second valve 62. In some embodiments, the second and third valves 62 and 64 may embody electronically or manually controlled shut off valves or check valves, for example, any suitable example of a shut off valve or check valve disclosed herein. In some embodiments, the controller 100 may comprise logic to open or close the first, second, and third valves 60, 62, and 64 based on the specific supply scheme or mode operated (e.g., parallel or series mode).

In view of the forgoing arrangement of the system 10, various aspects should be apparent, including the following nonlimiting aspects.

The system 10 may comprise two or more gas supply devices 40 and 80 that are fluidly connected so that the outputs of either or both of the gas supply devices 40 and 80 can be used for an application to meet the demands of that application. If only one of the two gas supply devices 40 or 80 is desired or required to meet the demands of an application, the gas supply devices 40 and 80 may be connected in parallel (i.e., the parallel mode) and either gas supply device 40 or 80 can be operated to produce the output of the system 10. If both gas supply devices 40 or 80 are desired or required to meet the demands of an application, the devices 40 and 80 may be connected in parallel (i.e., the parallel mode) and both devices 40 and 80 may be operated to produce and increase the volumetric output of the system 10. Alternatively, the gas supply devices 40 and 80 may be connected and operated in series (i.e., the series mode) to produce and increase the pressure of the gas to the desired system pressurized gas output at the system outlet 110.

In some embodiments, the system is capable of creating positive air displacements greater than 0.0 cubic feet per minute (cfm) at positive pressures greater than 0.5 psig.

In some embodiments, the gas supply devices 40 and 80 may be one or more of any of the following positive displacement and/or positive pressure creating devices: compressors, positive displacement blowers, centrifugal blowers, super chargers, gas generators, and turbo chargers, etc.

Further still, the system 10 may include at least one control valve 90 to switch between parallel and series modes, wherein when in the series mode, the output of the first gas supply device 40 is connected to the inlet of the second gas supply device 80.

The system 10 represented in FIG. 1 is capable of operating as an independent system and may be capable of operating in combination with other systems of a similar nature to increase overall pressurized gas production. In such a scenario, at least one additional control valve may be utilized to align the output of one system with the inlets of other system(s).

The system may further include an aftercooler to lower the overall discharge temperature of the pressurized gas produced by the system. The system may further include an interstage cooler between the first and second gas supply devices 40 and 80 to lower the pressurized gas temperature when the system operating in the series mode, wherein the discharge gas of the first gas supply device 40 is delivered to the inlet 80*a* of the second gas supply device 80.

The system may include means (e.g., a check valve, a ball valve, a gate valve, a shut off valve, etc.) for preventing the backflow of pressurized gas from the first gas supply device 40 to the second gas supply device 80, or from the second gas supply device 80 to the first gas supply device 40, for example, when the system is operated to use a single gas supply device of the first and second devices 40 and 80 and/or to prevent pressurized gas supplied by the second gas supply device 80 from flowing toward the control valve 90 and the first gas supply device 40 when both devices 40 and 80 are operated in the series mode.

The system may include one or more control means (e.g., a controller 100 as shown) for controlling the system to utilize the output of a single device of the first and second gas supply devices 40 and 80, or when operating the system 10 in the parallel or series modes utilizing the outputs of both of the first and second gas supply devices 40 and 80.

The system may utilize controls that monitor safety parameters of the system (e.g., pressure, flow rate, temperature). In some embodiments, the controls may embody pressure switches, pressure regulators, pressure sensors, temperature sensors, flow control valves, pressure or temperature gauges, and indication lights. The system may comprise logic to actuate the controls via electronic methods (e.g., computer readable instructions) such as but not limited to integrated software.

The system and its devices 40 and 80 may be driven with an external power source such, as but not limited to an electric drive system containing an electric motor, a hydraulicly driven system, or an internal combustion engine.

The system may pair two (or more) gas supply devices 40 and 80 having the same air output parameters, or pair two (or more) devices 40 and 80 having different air output parameters.

The system may pair two (or more) gas supply devices 40 and 80 that operate utilizing the same mechanical compression methods, or pair two (or more) devices 40 and 80 that operate utilizing different mechanical compression methods.

The system may include an overpressure safety device that is sized for the end use application.

The gas supply devices 40 and 80 can be driven using gear or belt ratio drives, a gear box, and/or a direct drive unit to ensure the devices 40 and 80 operate at appropriate speeds (rotations per minute, rpms).

The system may include means for reducing gas pulsation as may be desired or required by one or both gas supply devices 40 and 80 or by an application that is supplied by the system. Furthermore, the system may utilize any suitable conduit to convey pressurized gas therethrough or therefrom, for example, a hose (e.g., a high temperature silicone hose, an air hose, or a hydraulic hose), a pipe, a tube, or any other suitable form for conveying the particular type of pressurized gas supplied therefrom.

Figure 2:
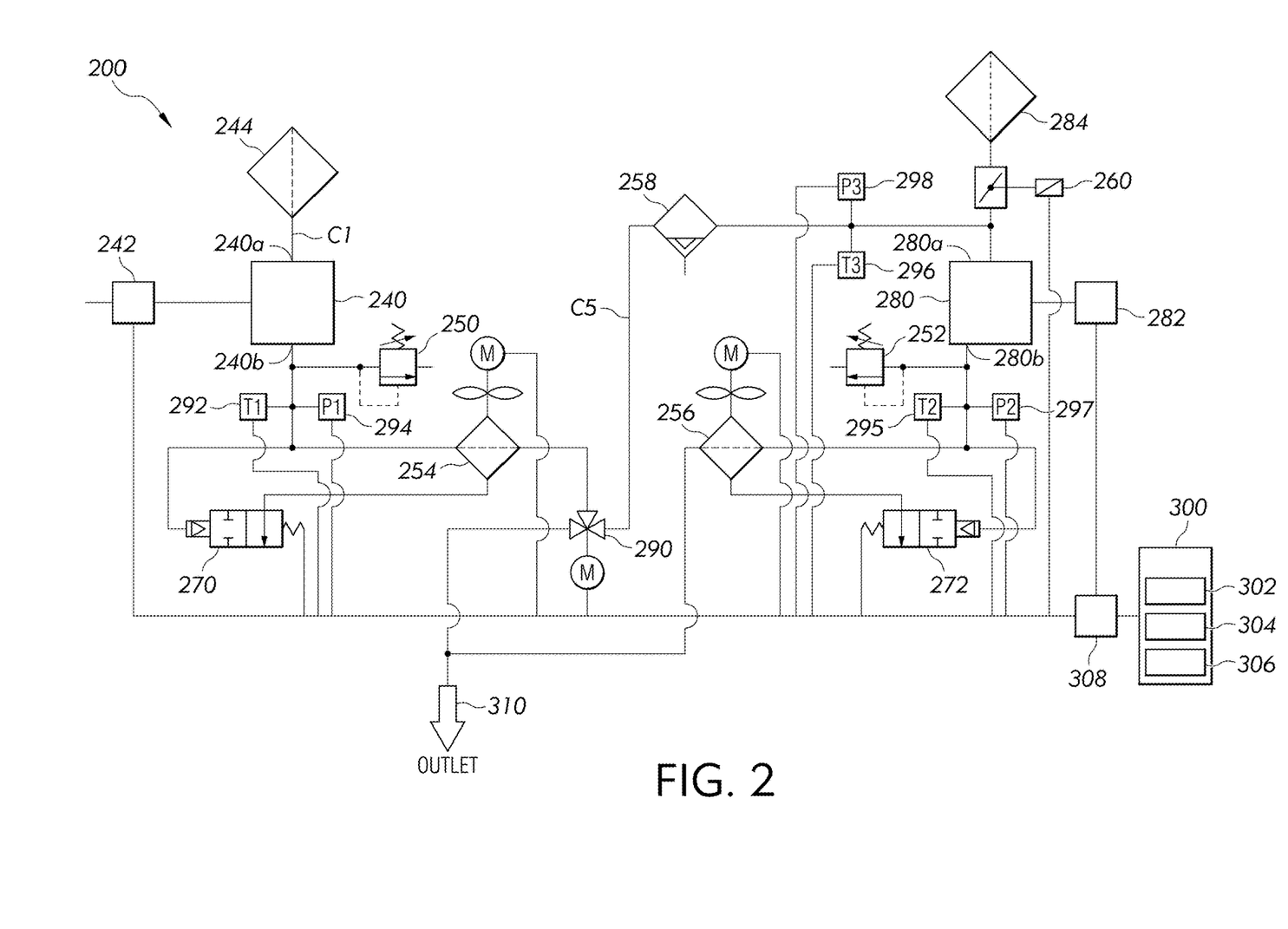
FIG. 2 schematically illustrates another example of a multi-stage pressurized gas delivery system in accordance with a second nonlimiting embodiment of the present disclosure.

Turning now to FIG. 2, another example multi-stage pressurized gas delivery system 200 is shown. Similar reference numbers will be used to depict similar features. Further still, a description of similar features has been omitted for brevity. In the embodiment shown, a first temperature sensor 292 and a first pressure sensor 294 are disposed between the outlet 240*b* of the first gas supply device 240 and the control valve 290, respectively, to monitor the temperature and pressure of the first pressurized gas output, and transmit the corresponding temperature and pressure data to the controller 300 (e.g., in real time). The first temperature sensor 292 and the first pressure sensor 294 may take on any suitable forms. For example, the temperature sensor 292 may embody a thermistor, temperature transducer, a thermocouple, a resistance temperature detector (RTD), a semi-conductor-based sensor, and or any other suitable example configured to measure the temperature of gas supplied through a conduit. Further still, the pressure sensor 294 may embody any suitable form, for example a strain gauge, a pressure transducer, a piezoresistive pressure sensor, an inductive pressure sensor, a capacitive pressure sensor, and or any other suitable example configured to measure the pressure of gas supplied through a conduit. A first pressure relief valve 250 may also be disposed between the control valve 290 and the outlet 240*b* of the first gas supply device 240. The pressure relief valve 250 may be operable to limit the gas pressure in the conduit from exceeding a maximum pressure value, e.g., a predetermined maximum pressure value that (when exceeded) could damage the system (e.g., components downstream of the first pressure relief valve 250). The pressure relief valve 250 may take on any suitable form, for example, a spring-loaded pressure relief valve, a pilot operated pressure relief valve, a temperature activated pressure relief valve, a piston-type relief valve, a diaphragm type relief valve, or any other suitable example thereof.

A first cooler 254 may be disposed between the valve 290 and the outlet 240*b* of the first gas supply device 240 to cool the first pressurized gas output. The first cooler 254 may take on any suitable form, for example, an electric cooler (driven by a power unit (e.g., a motor)), a fan, an air-cooled after cooler, a heat sink, and the like. In some embodiments, the first cooler 254 may be fluidly connected to a first tap 270 (e.g., a mechanical or electric-actuated valve, for example a two-way solenoid valve)) that is operable to expel accumulated moisture from the first cooler 254, for example, during system shutdown. It is contemplated that the first cooler 254 may be actuated manually or via the controller 300, for example, when the temperature of the first pressurized gas output exceeds a maximum temperature value (as measured via the first temperature sensor 292). Maintaining the temperature of the pressurized gas in this manner may advantageously preclude the possibility of damaging downstream components (e.g., the control valve 290, the second device 280 when in series mode, or a component receiving gas from the system outlet 310) due to high temperature/heat exposure.

Still referring to FIG. 2, a second temperature sensor 295 and a second pressure sensor 297 may be disposed between the outlet 280*b* of the second gas supply device 280 and the control valve 290, respectively, to monitor the temperature and pressure of the second pressurized gas output, and provide the corresponding temperature and pressure data to the controller 300 (e.g., in real time). The second temperature sensor 295 and second pressure sensor 297 may take on any suitable forms, for example, any suitable example disclosed herein. A second pressure relief valve 252 may be disposed between the control valve 290 and the outlet 280*b* of the second gas supply device 280. The second pressure relief valve 252 may be operable to limit the amount of pressure in the conduit, e.g., to avoid exceeding a maximum pressure value that (when exceeded) would damage the system (e.g., components downstream from the second pressure relief valve 252). The second pressure relief valve 252 may take on any suitable form, for example, any suitable example disclosed herein. A second cooler 256 may be disposed between the valve 290 and the outlet 280*b* of the first gas supply device 240. It is contemplated that the second cooler 256 may be actuated manually or via the controller 300, for example, when the temperature of the second pressurized gas output exceeds a maximum temperature value (as measured via the second temperature sensor 295). Maintaining the temperature of the pressurized gas in this manner may help preclude the possibility of damaging downstream components (e.g., components receiving pressurized gas from the system outlet 310) due to high temperature/heat exposure. The second cooler 256 may take on any suitable form, for example, any suitable example disclosed herein. In some embodiments, the second cooler 256 may be fluidly connected to a second tap 272. The second tap 272 may embody a mechanical or electronically actuated valve (e.g., a two-way valve) that is operable to expel accumulated moisture from the second cooler 256, for example, during system shutdown.

A third temperature sensor 296 and a third pressure sensor 298 may be disposed on the innerstage conduit C5, respectively, to monitor the temperature and pressure of the first pressurized gas output supplied from the first gas supply device 240 (via the control valve 290) to the second gas supply device 280 (e.g., when in series mode). The third temperature sensor 296 and the third pressure sensor 298 may provide the corresponding temperature and pressure data to the controller 300, to balance the load between the first and second gas supply devices 240 and 280 (e.g., to avoid overheating one or both of the devices) when operating in the series mode, as discussed in detail below. In addition, a water separator 258 may be disposed on the innerstage conduit C5, to remove ambient moisture from the first pressurized gas output (e.g., compressed air) supplied to the second gas supply device 280 from the first gas supply device 240. The water separator 256 may take on any suitable form, for example, a centrifugal water separator, a gravity operated water separator, a moisture filter containing a desiccant (e.g., silica gel), and the like. In some embodiments, another water separator may be disposed adjacent to the system outlet 310 to remove moisture from the system pressurized gas output before it is supplied to a downstream application via the system outlet 310 (to limit the amount of moisture introduced to the downstream application).

Figure 3:
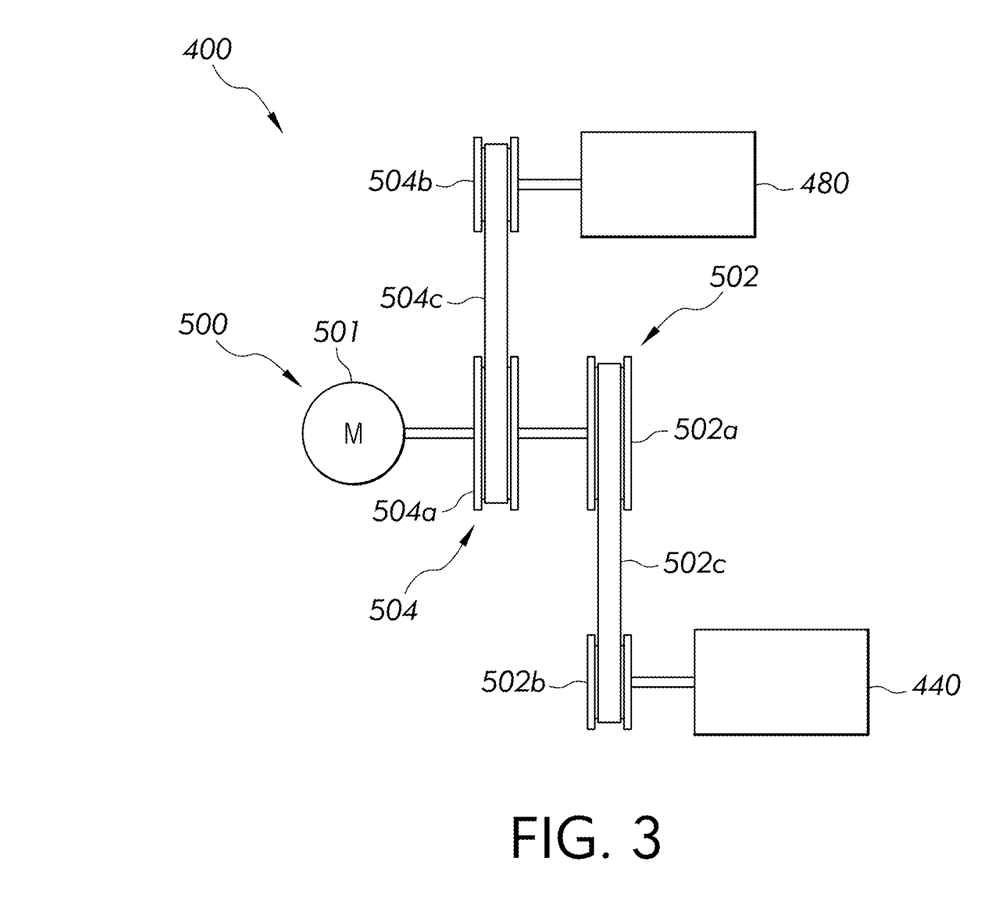
FIG. 3 schematically illustrates an example driver in accordance with an embodiment.

Turning now to FIG. 3, an example driver 500 according to another embodiment will now be described. In this embodiment, the driver 500 is a single driver configured to power a first gas supply device 440 and a second gas supply device 480. The driver 500 may be configured to independently control the speeds (rotations per minute, RPMS) of the first and second gas supply devices 440 and 480, for example, the speeds of the associated pressurized gas producing elements thereof (e.g., rotary screw elements, rotors, blades, impellers, reciprocating pistons, and the like). Specifically, the driver 500 may comprise a motor 501 configured to power first and second continuously variable transmissions (CVTs) 502 and 504 respectively associated with the first gas supply device 440 and the second gas supply device 480. The first CVT 502 may comprise first and second sheaves 502a and 502b rotatably coupled via a belt 502c therebetween. The first sheave 502a may embody a primary clutch, and the second sheave 502b may embody a driven clutch. When the primary sheave 502a is rotated (via the motor 501) and engaged with the belt 502c, the primary sheave 502a will cause the driven sheave 502b to rotate, thereby rotating the pressurized gas producing elements of the first device 440 to generate pressurized gas based on the specific pressure and flow requirement required by the application. Likewise, the second CVT 504 may comprise similar elements to the first CVT 502 to independently control the speed of the second device 480, the pressurized gas producing elements thereof. Accordingly, a description of similar elements has been omitted for brevity.

Figure 4:
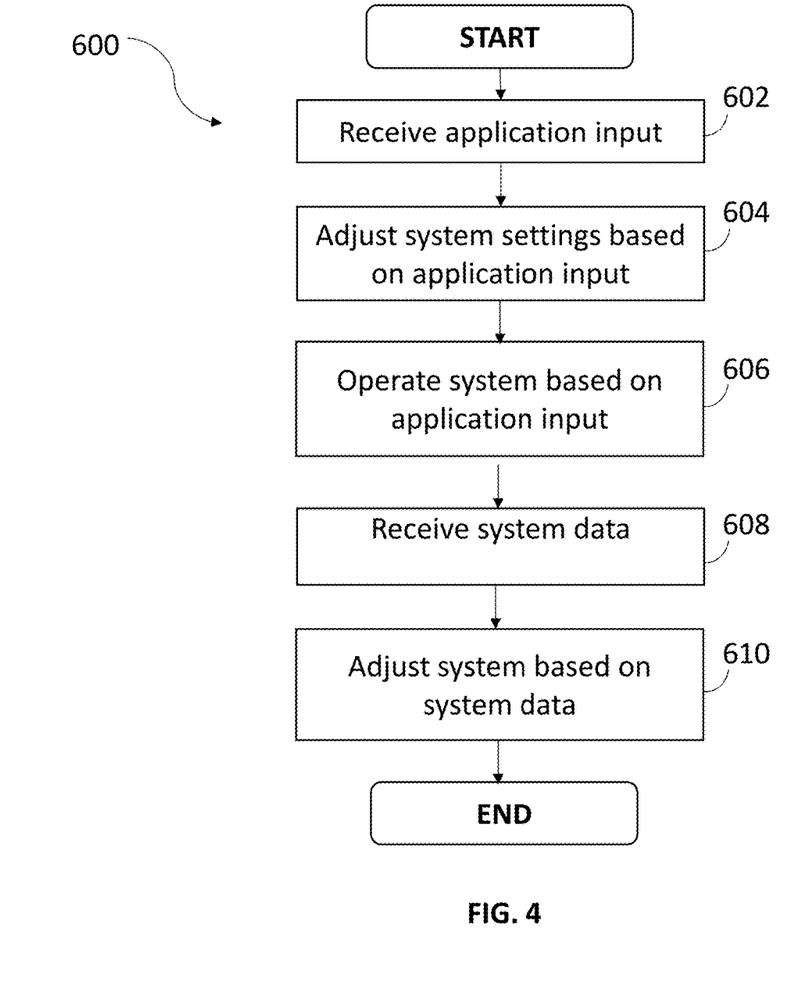
FIG. 4 is a flowchart illustrating an example method of supplying pressurized gas via a multi-stage pressurized gas delivery system.

Referring to FIG. 4, an example method of operating system will now be described with reference to the example system 200 of FIG. 2. Although it should be understood that the following description may also apply to other systems falling within the scope of the present disclosure, for example, system 100 or a system utilizing a different driver configuration (e.g., driver 500 of FIG. 3). At step 602, the controller 300 may receive a gas application input comprising instructions to provide a certain system pressurized gas output, for example, instructions to achieve a predetermined flow rate or pressure requirement at the system outlet 310. In some embodiments, the gas application input may be selected via the user interface 306 (FIG. 2) of the controller 300. For instance, the gas application input may define system pressurized gas output data for a specific gas application input, for example, 200 cfm of air at 5 psig for a 6" pipe, 175 cfm of air at 9 psig for a 4" pipe, 125 cfm of air at 1 psig for a 3" pipe, or 50 cfm of air at 30 psig for a 4" pipe. At step 604, the controller 300 may comprise logic to adjust system settings to produce the system pressurized gas output based on the gas application input. For example, the controller 300 may set the control valve 290 to an appropriate position (e.g., a first or second position) to achieve a certain pressure and/or flow rate prescribed by the gas application input. For instance, to supply 50 cfm at 30 psig for a 4" pipe, the controller 300 may set the position of the control valve 290 to a second position to activate a "series mode." In this configuration, the first pressurized gas output of the first gas supply device 240 is routed to the second gas supply device 280 (via the innerstage conduit C5) to attain the 30 psig target (a high pressure requirement), which otherwise would not be possible by operating only one of the first and second gas supply devices 240 and 280, e.g., based on output pressure and temperature limitations for a single gas supply device as discussed above. In this manner, the various examples of multi-stage pressurized gas delivery systems disclosed herein enable producing pressurized gas at higher pressures in a manner that modulates heat generation via the operation of two or more devices in series (i.e., by distributing the system load between two devices instead of one). In some embodiments, it is contemplated that there may be more than two gas supply devices in series, for example, to further increase the maximum output pressure capability of the system (e.g., from 30 psig with two gas supply devices, to an even higher pressure with three gas supply devices operating in series mode).

At step 604, in some embodiments, the controller 300 may adjust the control valve 290 and/or other system 200 components based on control logic or instructions (e.g., software stored in the storage device) to achieve the system pressurized gas output (i.e., a pressure and flow rate requirement prescribed for a gas application input). For example, the controller 300 may set the second valve 260 to a closed position (e.g., in series mode) to preclude the first pressurized gas output from backflowing to the second filter 284. In some embodiments, at step 604, the controller 300 may adjust the control valve 300 to a parallel mode (e.g., a first position), for example, when it is desired to supply the cumulative output from both of the first and second gas supply devices 240 and 280 to achieve a higher volumetric flow rate requirement (wherein the first and second gas supply devices will equalize in pressure to increase flow), or when it is desired to only operate one of the first and second devices (e.g., to achieve a lower pressure and/or volumetric flow rate requirement). For instance, the controller 300 may receive a gas application input defining system pressurized gas output data of 200 cfm at 5 psig for a 6" pipe. To achieve this flow rate (a high flow rate requirement), the controller 300 may set the control valve 290 to the first position such that the first pressurized gas output supplied from the first device 240 is supplied directly to the air outlet 310, and the second pressurized gas output supplied from the second device 280 is supplied directly to the air outlet 310 to attain the system pressurized gas output, i.e., a 200 cfm flow requirement. In some embodiments, it is contemplated that more than two devices may be operated in the parallel mode, for example, to increase the volumetric flow rate capability of the system (e.g., to increase from 200 cfm to an even higher flow).

At step 606, the controller may comprise logic to operate components of the system to achieve a system pressurized gas output. For example, the controller may operate one or both of the first and second gas supply devices 240 and 260 to produce a specific system pressurized gas output corresponding to a gas application input. In some embodiments, the controller 300 may set the speeds of the drivers 242 and 282 (e.g., motors) such that the drivers rotate the pressurized gas producing elements of the first and second gas supply devices 240 and 280 (e.g., blades, rotors, rotary screws, impellers, reciprocating pistons, etc.) to achieve the system pressurized gas output (e.g., pressure and flow rate of gas supplied from the system outlet 310). In embodiments wherein a single driver (e.g., 500 in FIG. 3) is utilized to power the first and second devices, the controller 300 may set the speeds of the CVTs 502 and 504 to achieve the system pressurized gas output.

At step 608, the controller 300 may receive system data, including, but not limited to, pressure data (e.g., from pressure sensors 294, 297, and 298), temperature data (e.g., from temperature sensors 292, 295, and 296), flow rate data (e.g., via a flowmeter disposed on outlet sides of first and second devices), humidity data (e.g., from humidity sensors configured to sense a moisture level of pressurized gas supplied from one or both of the first and second devices 240 and 280). This aspect of the present disclosure is particularly beneficial to control or otherwise adjust the system (step 610) in a manner that accounts for the current state operating conditions of the system in real time. For example, at step 610, the controller 300 may receive system data, and then adjust the system components (e.g., the first and second devices 240 and 280, the first and second coolers 254 and 256, the first and second taps 270 and 282, the first and second valves (e.g., 60 and 64 in FIG. 1, or 260 in FIG. 2)) based on the system data to attain the system pressurized gas output (for a specific gas application input) taking into account the current state operating conditions of the system. For instance, the controller 300 may receive temperature data (e.g., from temperature sensor 291) indicating that the temperature of the first pressurized gas output supplied from the first device 240 has exceeded a maximum, predetermined threshold value indicative of a system issue (requiring further investigation). In response, at step 610, the controller 300 may deactivate the first device 240 (e.g., by turning off the first driver 242 or turning off the entire system). In another non-limiting example, the controller 300 may receive pressure data (e.g., from pressure sensor 294) indicating that the gas pressure supplied from the first device 240 has exceeded a maximum, predetermined threshold. In response, the controller 300 may (in real time) adjust the driver 242 (e.g., decrease a motor speed) to bring the pressure down to an acceptable range or target value defined by the gas application input. While the foregoing examples are in reference to the first driver 240, it should be understood that the preceding examples may also apply to the second driver 280.

When operating in the series mode (at step 612), the controller 300 may also receive system data (e.g., pressure and temperature data) from the third pressure sensor 298 and the third temperature sensor 296 (i.e., an innerstage pressure and innerstage temperature values). The innerstage pressure and innerstage temperature values may be used by the controller 300 to balance the load between the first and second gas supply devices 240 and 280, e.g., to prevent overheating or overpressurizing the second gas supply device. For example, if the inner stage pressure and temperature values exceed predetermined values (e.g., 7 psig, 350 deg. F.), the controller 300 may decrease the speed of the first gas supply device 240 (e.g., via the first driver 242) to bring the inner stage pressure and temperature back to an acceptable range or target value, e.g., to avoid introducing a first pressurized gas output (exceeding a temperature or pressure threshold) from the first gas supply device 240 into the second gas supply device 280. Monitoring the innerstage pressure and innerstage temperature may also be advantageous to avoid over-pressurizing the second gas supply device 280, for example, to control the speed of the first gas supply device (e.g., the speed of the respective pressurized gas producing elements thereof) to prevent introducing a high innerstage pressure gas (as an input to the second gas supply device) that may damage internal components of the second gas supply device, or compromise efficiency by blowing some of the first pressurized gas output past the gas pressure producing elements (e.g., the rotors, blades, and the like) of the second gas supply device. Likewise, supplying a gas with a low innerstage pressure into the inlet of the second gas supply device may starve the second gas supply device (e.g., creating a vacuum), hindering the efficiency of producing the second pressurized gas output. It is also contemplated that the controller 300 may modulate the speed of the second gas supply device 280 (by itself, or concurrently with the speed of the first gas supply device 240) to attain a target interstage pressure and innerstage temperature appropriate for the specific application.

At step 610, it is also contemplated that the controller 300 may activate or adjust other system components to obtain the system pressurized gas output. For example, the controller 300 may activate cooler 254 to control the innerstage temperature of the first pressurized gas output supplied from the first gas supply device to the second gas supply device in the series mode. In some embodiments, the controller 300 may decrease the speed of the first gas supply device 240 based on inner stage pressure and temperature values exceeding target values. In some embodiments, the controller 300 may decrease the speed of the second gas supply device 280 if the pressure and temperature of gas (monitored via temperature sensor 295 and pressure sensor 297) exceed predetermined values. In some embodiments, the controller 300 may activate the first cooler 254 to bring the temperature of the second pressurized gas output (measured by sensor 295) supplied from the second gas supply device 280 back to an acceptable target value. In another non-limiting example, the controller 300 may actuate one or both of the first and second coolers 254 and 256 to control the temperature of the system pressurized gas output supplied from the system outlet 310 based on temperature measurements, for example, based on temperature measurements from temperature sensors 292 or 295 in parallel mode, or sensors 292, 295, and 296 in series mode.

In some embodiments, the controller 300 may also increase the speed of the first and/or second drivers 240 and 280, for example, if pressure and/or flow rate (cfm) values (as measured by the temperature sensors and flow meters) are below certain target values. In this manner, it should be understood that a wide variety of system adjustments may be made based on system data to achieve a desired system pressurized gas output.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For instance, it is contemplated that a plurality of systems may be operated to generate a total pressurized gas output (for a given application), derived from the respective pressurized gas outputs of the plurality of systems. Moreover, it is contemplated that the arrangement of system components may vary from that which is shown in the illustrated examples, for example, by disposing temperature sensors, pressure sensors, coolers, pressure relief valves, or other system components at different locations from that which is shown. Therefore, the invention, in its broader aspects, is not limited to the specific details, the representative apparatus, and illustrative examples shown and described. Accordingly, departures can be made from such details without departing from the spirit or scope of the applicants' general inventive concept.

The invention claimed is:

1. A pressurized gas delivery system comprises:
   a first gas supply source configured to supply a first pressurized gas output;
   a second gas supply source configured to supply a second pressurized gas output;
   a control valve comprising at least a first position and a second position, wherein the control valve is configured to connect an outlet of the first gas supply source to a system outlet in the first position, and connect an outlet of the first gas supply source to an inlet of the second gas supply source in the second position, wherein in the first position, the control valve directs the first pressurized gas output to the system outlet in a parallel mode, and wherein in the second position, the control valve directs the first pressurized gas output to the inlet of the second gas supply source in a series mode;
   a pressure sensor disposed between the control valve and the inlet of the second gas supply source; and
   a controller, wherein the controller comprises logic:
   to receive an application input defining the system pressurized gas output; and
   adjust the control valve to the first position or the second position based on the application input, and
   receive a pressure measurement from the pressure sensor and adjust a speed of the first gas supply source or the second gas supply source based on the pressure measurement.

2. The pressurized gas delivery system of claim 1, wherein an outlet of the second gas supply source is fluidly connected to the system outlet.

3. The pressurized gas delivery system of claim 1, wherein in the parallel mode, the control valve directs the first pressurized gas output to the system outlet and the second gas supply source directs the second pressurized gas output to the system outlet to increase the flow rate of the system pressurized gas output.

4. The pressurized gas delivery system of claim 1, wherein in the series mode, the first pressurized gas output is directed to the inlet of the second gas supply source at a first pressure value, and wherein the second gas supply source is configured to increase the pressure of the first pressurized gas output to a second pressure value exceeding the first pressure value such that the second pressurized gas output comprises the second pressure value.

5. The pressurized gas delivery system of claim 4, wherein the second pressurized gas output is supplied to the system outlet to increase the pressure of the system pressurized gas output.

6. The pressurized gas delivery system of claim 1, wherein the control valve comprises a third position, wherein in the third position, the control valve impedes the first pressurized gas output from passing therethrough.

7. The pressurized gas delivery system of claim 1, wherein the first gas supply source is driven via a first driver, and the second gas supply source is driven via a second driver, wherein the first driver is operable to adjust a speed of the first gas supply device to adjust the pressure of the first pressurized gas output, and the second driver is configured to adjust a speed of the second gas supply device to adjust the pressure of the second pressurized gas output.

8. The pressurized gas delivery system of claim 1, wherein the system further comprises a first cooler disposed between the outlet of the first gas supply device and the control valve, wherein the first cooler is configured to adjust the temperature of the first pressurized gas output.

9. The pressurized gas delivery system of claim 8, wherein the system further comprises a temperature sensor disposed between the outlet of the first gas supply device and the control valve, wherein the controller is configured to receive a first temperature measurement from the first temperature sensor and adjust the speed of the first gas supply device or the second gas supply device based on the first temperature measurement.

10. The pressurized gas delivery system of claim 1, wherein the system comprises a second cooler disposed between the outlet of the second gas supply device and the system outlet, wherein the second cooler is configured to adjust the temperature of the second pressurized gas output.

11. The pressurized gas delivery system of claim 1, wherein the system further comprises a second temperature sensor disposed between the outlet of second gas supply device and the system outlet, wherein the controller is configured to receive a second temperature measurement from the second temperature sensor and adjust the speed of the first gas supply device or the second gas supply device based on the second temperature measurement.

12. The pressurized gas delivery system of claim 1, wherein the system further comprises a second pressure sensor disposed between the outlet of the first gas supply device and the control valve, wherein the controller is configured to receive a pressure measurement from the second pressure sensor and adjust the speed of the first gas supply device or the second gas supply device based on the pressure measurement of the second pressure sensor.

13. The pressurized gas delivery system of claim 1, wherein the system further comprises a third pressure sensor disposed between the outlet of the second gas supply device and the system outlet, wherein the controller is configured to receive a pressure measurement from the third pressure sensor and adjust the speed of the second gas supply device or the first gas supply device based on the pressure measurement of the third pressure sensor.

14. The pressurized gas delivery system of claim 1, wherein the system further comprises a third temperature sensor disposed between the control valve and the inlet of the second gas supply device, wherein the controller is configured to receive a third temperature measurement from the third temperature sensor and adjust the speed of the first gas supply device or the second gas supply device based on the third temperature measurement.

15. The pressurized gas delivery system of claim 1, wherein the system further comprises a water separator disposed between the control valve and the inlet of the second gas supply device, wherein the water separator is configured to remove moisture from the first pressurized gas output supplied to the second gas supply device in the series mode.

16. The pressurized gas delivery system of claim 1, wherein the wherein the first gas supply source and the second gas supply device are driven via a single driver, wherein the single driver comprises a first continuously variable transmission (CVT) operatively connected to the first gas supply device, and a second CVT operatively connected to the second gas supply device, wherein the first CVT is configured to independently adjust a speed of the first gas supply device, and the second CVT is configured to independently adjust a speed of the second gas supply device.

17. A method of producing pressurized gas with a gas delivery system including a controller operatively connected to a first gas supply device, a control valve, and a second gas supply device, the method comprises:
- receiving, via the controller, an application input defining a system pressurized gas system output;
- adjusting, via the controller, the control valve to at least one of a first position or a second position based on the application input, wherein the first position corresponds to a parallel mode to increase the flow rate of the system pressurized gas output, and the second position corresponds to a series mode to increase the pressure of the system pressurized gas output; and
- receiving system data via the controller;
- adjusting at least one of the first gas supply device and the second gas supply device based on the system data to maintain the system pressurized gas output.

18. The method of producing pressurized gas of claim 17, wherein the method further comprises:
- operating the first gas supply device to produce a first pressurized gas output;
- supplying the first pressurized gas output to the second gas supply device;
- operating the second gas supply device utilizing the first pressurized gas output to produce a second pressurized gas output having a pressure that is higher than a pressure of the first pressurized gas output; and
- supplying the second pressurized gas output to the system outlet as the system pressurized gas output when the control valve is set to the series mode.

* * * * *